(12) United States Patent
Medard et al.

(10) Patent No.: US 11,025,600 B1
(45) Date of Patent: Jun. 1, 2021

(54) SYSTEM FOR DE-DUPLICATING NETWORK CODED DISTRIBUTED STORAGE AND RELATED TECHNIQUES

(71) Applicant: Massachusetts Institute of Technology, Cambridge, MA (US)

(72) Inventors: Muriel Medard, Belmont, MA (US); Prakash Narayana Moorthy, Framingham, MA (US); Vitaly Abdrashitov, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 229 days.

(21) Appl. No.: 16/184,272

(22) Filed: Nov. 8, 2018

Related U.S. Application Data

(60) Provisional application No. 62/584,337, filed on Nov. 10, 2017, provisional application No. 62/583,206, filed on Nov. 8, 2017.

(51) Int. Cl.
*H04L 29/06* (2006.01)
*G06F 11/14* (2006.01)
(Continued)

(52) U.S. Cl.
CPC ...... *H04L 63/0471* (2013.01); *G06F 16/1827* (2019.01); *G06F 16/256* (2019.01);
(Continued)

(58) Field of Classification Search
CPC ............... G06F 16/1748; G06F 16/137; G06F 16/1827; G06F 16/256; G06F 16/25;
(Continued)

(56) References Cited

U.S. PATENT DOCUMENTS 8,290,919 B1 * 10/2012 Kelly .................... G06F 16/137
707/698
8,495,392 B1 7/2013 Bardale
(Continued)

OTHER PUBLICATIONS

PCT International Preliminary Report dated May 22, 2020 for International Application No. PCT/US2018/059768; 10 Pages.
(Continued)

*Primary Examiner* — Mohammad A Siddiqi
(74) *Attorney, Agent, or Firm* — Daly, Crowley, Mofford & Durkee, LLP

(57) ABSTRACT

Methods for encoding a file and de-duplicating a coded packet of the file are presented. The encoding method includes: identifying a file to be stored; encoding the file to generate a plurality of coded packets; generating a hash code associated with the file; distributing the plurality of coded packets to a plurality of storage nodes; and storing the hash code associated with the file in a hash server. The de-duplicating method includes: receiving a coded packet at a storage node; retrieving a hash code, from the hash server, corresponding to the coded packet; determining whether the coded packet has been stored in the storage node based upon the hash code; in response to determination that the coded packet has being stored, discarding the coded packet; and in response to determination that the coded packet has not being stored, storing the coded packet in the storage node.

20 Claims, 8 Drawing Sheets

(51) Int. Cl.
*G06F 16/25* (2019.01)
*H04L 29/12* (2006.01)
*H04L 12/24* (2006.01)
*G06F 16/182* (2019.01)

(52) U.S. Cl.
CPC .......... *H04L 41/12* (2013.01); *H04L 61/103* (2013.01); *H04L 61/2007* (2013.01); *H04L 61/6086* (2013.01)

(58) Field of Classification Search
CPC .......... G06F 15/17331; G06F 16/183; G06F 16/134; G06F 2009/45595; G06F 2009/45558; H04L 45/74; H04L 61/2007; H04L 41/12; H04L 61/103; H04L 67/1097; H04L 61/6086
See application file for complete search history.

(56) References Cited

U.S. PATENT DOCUMENTS

| | | | |
|---|---|---|---|
| 9,081,771 B1* | 7/2015 | Faibish | G06F 16/00 |
| 9,690,658 B2 | 6/2017 | Kato | |
| 9,804,925 B1 | 10/2017 | Carmi et al. | |
| 10,439,821 B2* | 10/2019 | Riley | H04L 9/0897 |
| 10,516,645 B1* | 12/2019 | Patel | H04L 61/2596 |
| 2001/0042171 A1* | 11/2001 | Vermeulen | G06F 16/9574 |
| | | | 711/118 |
| 2013/0103945 A1* | 4/2013 | Cannon | G06F 21/6209 |
| | | | 713/168 |
| 2013/0305039 A1* | 11/2013 | Gauda | G06F 21/6218 |
| | | | 713/153 |
| 2014/0016469 A1* | 1/2014 | Ho | H04L 1/0076 |
| | | | 370/235 |
| 2014/0025770 A1* | 1/2014 | Warfield | G06F 16/256 |
| | | | 709/213 |
| 2014/0025948 A1 | 1/2014 | Bestler et al. | |
| 2014/0281486 A1 | 9/2014 | Nayshtut et al. | |
| 2015/0288514 A1* | 10/2015 | Pahl | H04L 63/166 |
| | | | 713/171 |
| 2016/0182088 A1* | 6/2016 | Sipos | H04L 67/1097 |
| | | | 714/764 |
| 2018/0018235 A1* | 1/2018 | Arslan | H03M 13/356 |
| 2018/0139131 A1* | 5/2018 | Ignatchenko | H04L 69/16 |
| 2018/0375652 A1* | 12/2018 | Karame | H04L 9/30 |

OTHER PUBLICATIONS

Dimakis, et al.; "A Survey on Network Codes for Distributed Storage;" Proceedings of the IEEE, vol. 99, No. 3; Mar. 2011; pp. 476-489; 13 Pages.

Dimakis, et al.; "Network Coding for Distributed Storage Systems;" IEEE Transactions on Information Theory, vol. 56, Issue 9; Aug. 16, 2010; 13 Pages.

Filks, et al.; "Magic Quadrant for Solid-State Arrays;" https://www.gartner.com; Jul. 13, 2017; 25 Pages.

Katz, et al.; "Compact Signatures for Network Coding;" Retrieved from: https://www.cs.umd.edu/~jkatz/papers/NetworkCodingSigs.pdf; Oct. 2009; 14 Pages.

Kim, et al.; "On Counteracting Byzantine Attacks in Network Coded Peer-to-Peer Networks;" IEEE Journal on Selected Areas in Communications, vol. 28, Issue 5; May 27, 2018; 11 Pages.

Krohn, et al.; "On-the-Fly Verification of Rateless Erasure Codes for Efficient Content Distribution;" IEEE Symposium on Security and Privacy; May 12, 2004; 15 Pages.

Ahlswede et al., "Network Information Flow;" Proceedings of the IEEE Transactions on Information Theory, vol. 46, No. 4; Jul. 2000; pp. 1204-1216; 13 Pages.

Charles et al., "Signatures for Network Coding;" International Journal of Information and Coding Theory; Mar. 2006; pp. 3-14; 7 Pages.

Ho et al., "A Random Linear Network Coding Approach to Multicast;" Proceedings of the IEEE Transactions on Information Theory, vol. 52, No. 10; Oct. 2006; pp. 4413-4430; 18 Pages.

Ho et al., "Byzantine Modification Detection in Multicast Networks with Random Network Coding;" Proceedings of the IEEE Transactions on Information Theory, vol. 54, No. 6; Jul. 2008; 8 Pages.

Prakash et al., "A Generalization of Regenerating Codes for Clustered Storage Systems;" Proceedings of the 54th Annual Allerton Conference on Communication, Control and Computing; Sep. 2016; 8 Pages.

Reed et al., "Polynomial Codes Over Certain Finite Fields;" Journal of the Society for Industrial and Applied Mathematics, vol. 8, No. 2; Jun. 1960; pp. 300-304; 5 Pages.

Wang et al., "Fast Subspace Search via Grassmannian Based Hashing;" Proceedings of the IEEE International Conference on Computer Vision; Jan. 2013; pp. 2776-2783; 8 Pages.

Wang et al., "Learning to Hash for Indexing Big Data—A Survey;" Proceedings of the IEEE, vol. 104, No. 1; Sep. 17, 2015; pp. 34-57; 22 Pages.

PCT International Search Report and Written Opinion dated Jan. 30, 2019 for International Application No. PCT/US2018/059768; 15 Pages.

* cited by examiner

SYSTEM FOR DE-DUPLICATING NETWORK CODED DISTRIBUTED STORAGE AND RELATED TECHNIQUES

CROSS-REFERENCE TO RELATED APPLICATIONS

This application claims the benefit of Provisional Application No. 62/583,206 filed Nov. 8, 2017 and entitled "SYSTEM FOR DE-DUPLICATING NETWORK CODED DISTRIBUTED STORAGE AND RELATED TECHNIQUES," and claims the benefit of Provisional Application No. 62/584,337 filed Nov. 10, 2017 and entitled "SYSTEM FOR DE-DUPLICATING NETWORK CODED DISTRIBUTED STORAGE AND RELATED TECHNIQUES," which applications are hereby incorporated herein by reference in their entireties.

GOVERNMENT RIGHTS

This invention was made with Government support under Grant No. CCF-1527270 awarded by the National Science Foundation, and Grant No. FA9550-14-1-0403 awarded by the Air Force Office of Scientific Research. The Government has certain rights in the invention.

BACKGROUND

As is known in the art, a distributed storage system includes a number of nodes in which data or a file may be stored. In operation, data or file to be stored may be divided (or "broken") into multiple pieces which may be referred to as packets (also sometimes referred to herein as "blocks" or "chunks"). Each node in the distributed storage system can store one or more of such packets. In this way, data or a file may be distributed among a plurality of different storage nodes.

There is no coordination among the storage nodes to decide which pieces of the file or date are stored in which nodes. Thus, more than one storage node may receive packets with the same contents.

As is also known, de-duplication is a compression technique used to eliminate redundant copies of data packets across various files stored in a storage system. Conventionally, de-duplication procedures take place in the "raw" data domain (i.e. two files are simply compared). De-duplication is performed in all modern day datacenters. The de-duplication software is often provided by the vendors who develop software for data center. One often distinguishes between source vs target de-duplication. Target de-duplication is performed in data centers that do back-up. Given the volume of data that gets backed-up, efficiency of deduplication will play a significant role in determining the cost of operation.

In distributed storage systems which utilize network coding (e.g., random linear network coding), fragments of coded data are spread across multiple storage nodes (i.e., data centers, servers, data storage systems). For example, in RAID (Redundant Array of Independent Disks) systems, random-linear network codes permit encoding the same "data stripe" differently by various clients. The difference between the clients may be created from the different selection of coding coefficients. In this situation, when a storage system receives coded data from various clients, traditional de-duplication techniques which directly compare any received data stripe with previously received data stripes would fail, since various clients encode the same stripe differently using different coding coefficients.

One solution to address the issue is for every client to decode the stripe, calculate a commonly agreed upon hash function, and include the hash when transferring the data packets. However, such a solution generates burden at the client side from the additional computational needs. The solution also possesses a security risk if the hash functions carry security properties.

Another option is for the storage node to decode every stripe that it receives, and compute a hash function, and search in a local data-base for a match. The computational demands of this solution are also burdensome to the storage node and make the solution impractical for both in-line and post-processing de-duplication strategies.

Thus, it is seen that the need for de-duplication in a coded domain arises at least in storage systems involving multiple clients, where each client directly offloads its coded data, e.g., as part of routine back-up, to a remote data-center. Since, as described above, random-linear network coding (RLNC) permits encoding the same data stripe differently by various clients, traditional de-duplication techniques which directly compare any received data stripe with previously received data stripes fail.

It would therefore, be desirable to provide a system and technique for carrying out de-duplication in distributed storage systems without requiring a coded packet to be de-coded to perform a de-duplication process.

SUMMARY

In one aspect of the concepts described herein, a hashing system and technique which obviates the need to decode every received coded stripe, in order to perform de-duplication is provided.

The hashing techniques described herein obviate the need to decode every received coded stripe, in order to perform de-duplication, and thus could potentially save significant computational resources in practical implementation.

According to one illustrative embodiment, a method for encoding a file may include: identifying a file to be stored; encoding the file to generate a plurality of coded packets; generating a hash code associated with the file; distributing the plurality of coded packets to a plurality of storage nodes; and storing the hash code associated with the file in a hash server.

In embodiments, the method may further include generating and storing a public key associated with a source node in the hash server.

In embodiments, the step of generating a hash code associated with the file may include generating a hash code for a plurality of files.

In embodiments, the step of encoding the file may include encoding the file using random linear network coding (RLNC) to generate a plurality of RLNC coded packets.

In embodiments, the step of distributing the plurality of coded packets to a plurality of storage nodes may further include at least one of: distributing the plurality of coded packets in a sequential order to a plurality of storage nodes; and distributing the plurality of coded packets in a random order to a plurality of storage nodes.

In embodiments, the step of distributing the plurality of coded packets to a plurality of storage nodes may further include distributing the plurality of coded packets to a plurality of storage nodes based upon a data transfer rate between at least one source node and at least some of the plurality of storage nodes.

According to another illustrative embodiment, an apparatus for encoding a file may include: a coded packet generator and a hash generator. Herein the coded packet may be configured to: encode the source file to generate a plurality of coded packets; and distribute the plurality of coded packets to a plurality of storage nodes. The hash generator may be configured to: generate a hash code associated with the source file; and store the hash code associated with the source file in a hash server.

In embodiments, the apparatus may further include a public key generator configured to generate and store a public key associated with the source node in the hash server.

In embodiments, the apparatus may further include means for identifying a source file to be stored.

According to yet another illustrative embodiment, a method for de-duplicating a coded packet in a distributed storage system may include: receiving a coded packet at a storage node; retrieving a hash code, from the hash server, corresponding to the coded packet; determining whether the coded packet has been stored in the storage node based upon the hash code; in response to determination that the coded packet has being stored, discarding the coded packet; and in response to determination that the coded packet has not being stored, storing the coded packet in the storage node.

In embodiments, the step of determining whether the coded packet has been stored in the storage node further comprises comparing the hash code to the coded packet to determine whether the coded packet has been stored in the storage node.

In embodiments, the method may further include: retrieving a public key, from the hash server, corresponding to a source node that sent the coded packet; and using the public key when determining whether the coded packet has been stored in the storage node.

In embodiments, the method may further include, in response to determination that the coded packet has not being stored, retrieving an additional hash code for an additional source node to determine whether the coded packet has been stored in the storage node. Herein, the method may further include retrieving an additional public key corresponding an additional source node to determine whether the coded packet has been stored in the storage node.

In embodiments, the step of receiving a coded packet at a storage node may comprise receiving a network coded packet. Furthermore, the step of receiving a coded packet at a storage node may comprise receiving a random linear network coded (RLNC) packet.

According to yet another illustrative embodiment, a storage node for de-duplicating a coded packet in a distributed storage system may include: a de-duplication processor, a storage space, and a storage processor. Herein the de-duplication processor may be configured to: receive a coded packet; retrieve a hash code, from the hash server, corresponding to the coded packet; determine whether the coded packet has been stored in the storage node based upon the hash code; in response to determination that the coded packet has being stored, discard the coded packet; and in response to determination that the coded packet has not being stored, store the coded packet in the storage node. The storage processor may be configured to store and retrieve data from/to the storage space.

In embodiments, the de-duplication processor may be further configured to: compare the hash code to the coded packet to determine whether the coded packet has been stored in the storage node.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

All relative descriptions herein, such as left, right, up, and down, are with reference to the figures, are merely relative and not meant in a limiting sense. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

Figure 1:
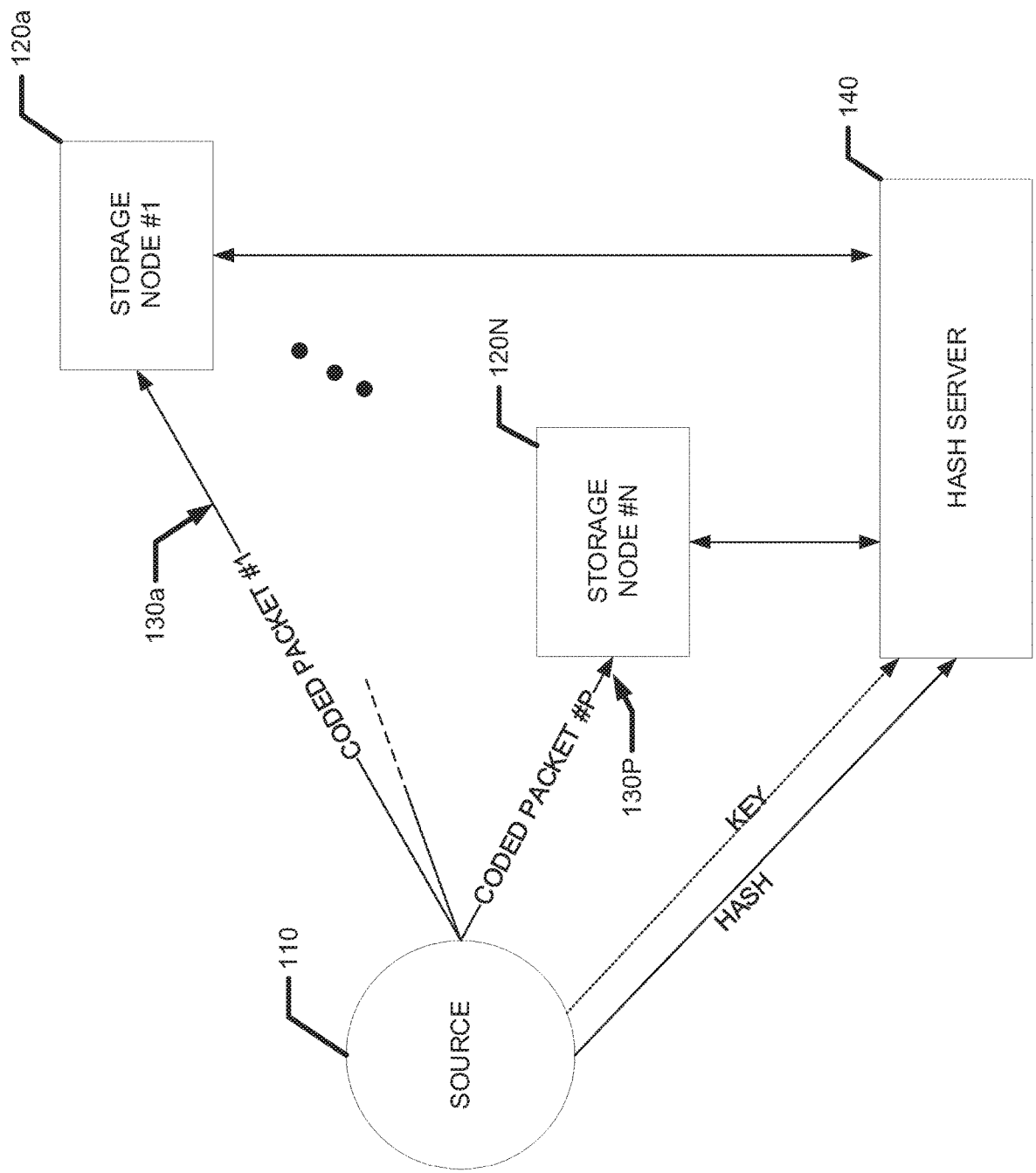
FIG. 1 is a block diagram of a single source storing a file as a plurality of coded packets in a distributed storage system having N storage nodes according to the concepts described herein.

Referring now to FIG. 1, a system includes a source node 110 (also sometimes referred to herein as a "client" or simply a "source") which processes files to be stored in a distributed storage system comprising one or more storage nodes 120a . . . 120N. To promote clarity in the description of the drawings as well as clarity in the description of the broad concepts disclosed herein, a single source node is shown. Those of ordinary skill in the art will appreciate, of course, that the concepts described herein also apply to systems having a plurality of source nodes, as described in conjunction with FIG. 4.

Herein, the source 110 is a device coupled to a network (e.g. an internet or an intranet) that is able to transfer data to other devices. The source 110 may be a computer, laptop, mobile device, or any other devices that is capable thereof. The storage node (e.g., 120a) is a device coupled to a network (e.g. an internet or an intranet) that is able to receive data from other devices and store the received data therein (e.g. in a storage including, but not limited to a random access memory, a hard drive, solid state drive (SSD), network attached storage (NAS), optical storage device, or any other type of storage now known or later discovered). The storage node may be a computer, server, data center, laptop, mobile device, storage device, or any other devices that is capable of storing data thereon.

The source 110 may apply network coding to a file to generate a plurality of P coded packets or blocks 130a-130P (or more generally, coded data 130a-130P). In embodiments, the network coding technique implemented by the source may be Linear Network Coding (LNC) and in particular the network coding may be Random Linear Network Coding (RLNC). The source 110 may distribute the plurality of P coded packets or blocks 130a-130P among a plurality of storage nodes 120a-120N.

Some or all of the storage nodes 120a-120N are capable of eliminating some (or ideally all) redundant coded blocks (e.g. redundant coded packets) stored therein. Such action may save storage space and reduce computational demands due to the redundant blocks. If RLNC or other network coding techniques are used, direct comparison fails as described above. Thus, another approach that does not require direct comparison is needed.

In addition to the network coding, the source 110 may generate a hash code (also sometimes referred to herein as a "hash value," "digital hash," or more simply a "hash") that is associated with the source file. The source 110 may store the hash code in a hash server 140 (also sometimes referred to herein as a "shared metadata server," "shared server," or "metadata server"). In embodiments, the source 110 may generate one hash code for a plurality of source files. The source 110 may also store a public key associated with the source 110 in the hash server. The hash server 140 is a device coupled to a network that is capable of receiving data from another device and storing the received data into its storage. The hash server also provides an interface to another device such that another device may access the stored hash codes and public keys. The hash server 140 may be a computer, server, laptop, mobile device, storage device, or any other devices that is capable of performing the necessary functions.

Furthermore, a public key is generated and stored for each source node. Only one public key is generated and stored for a source node, because the public key is independent of the input file whereas the hash is a function of the file. The public key is used in conjunction with the hash. In general, the source 110 may encode several files and generate one hash code. All public keys and hash codes are stored in the hash server 140.

One technique for computing a hash value will be described in detail below. An encoding process associated with storing the coded packets among the plurality of storage nodes in a manner which allows de-duplication of coded packets will be described below in conjunction with FIG. 2. Furthermore, a de-duplication process which allows de-duplication of coded packets will be described below in conjunction with FIG. 3.

Figure 1A:
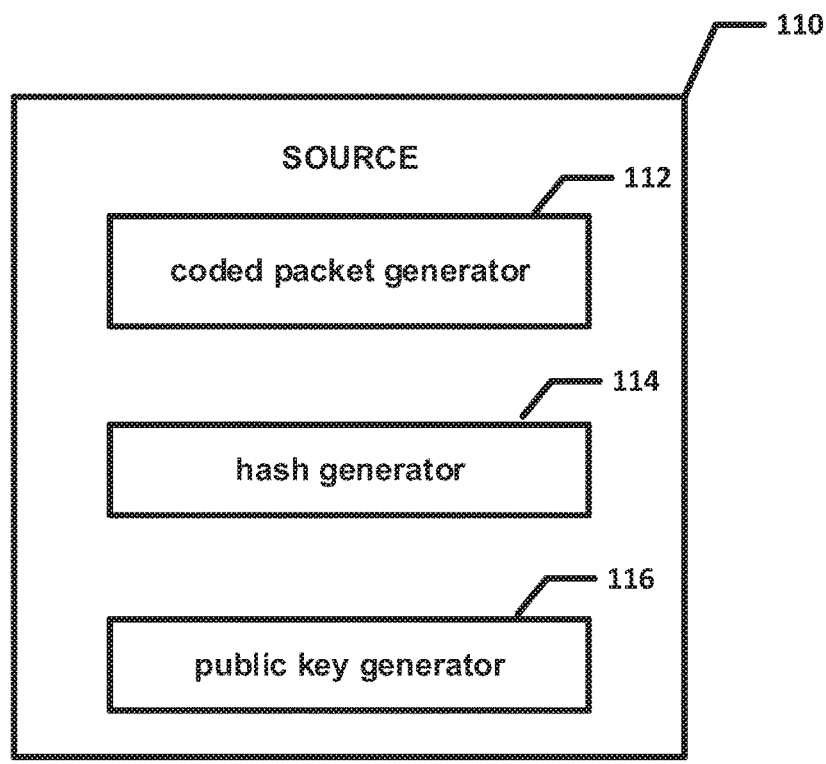
FIG. 1A is a block diagram of a source which may be the same as or similar to the source described above in conjunction with FIG. 1.

Referring now to FIG. 1A, a source node 110 may include a coded packet generator 112, a hash generator 124 and a public key generator 126. One illustrative example of the operation of hash generator 124 and a public key generator 126 is described below. The source node 110 may include a storage space (not shown, e.g., a memory and associated circuitry required to store data) to store coded packets, hash codes, and public keys generated according to the method described below in conjunction with FIG. 2.

Figure 1B:
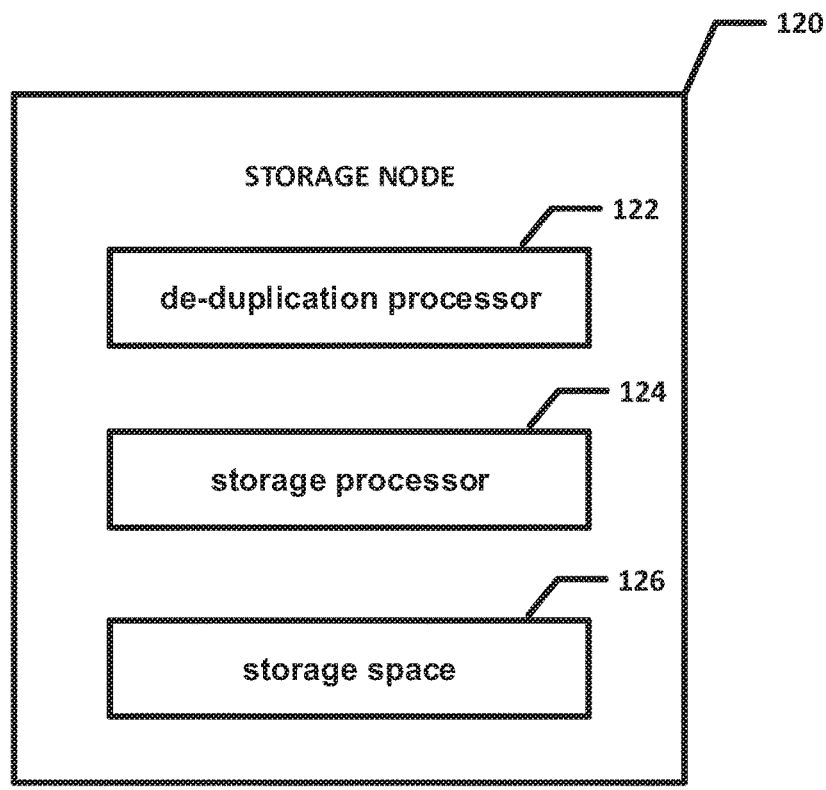
FIG. 1B is a block diagram of a storage node which may be the same as or similar to one of the storage nodes described above in conjunction with FIG. 1.

Referring now to FIG. 1B, a storage node 120 may include a de-duplication processor 122, a storage process 124, and a storage space 124 (e.g. a memory and associated circuitry required to store data such as a coded packet). One illustrative example of the operation of de-duplication processor is described below. The storage processor 124 may perform commands to store and retrieve data from the storage space 124.

One illustrative hashing technique suitable for use in (a system such as that described in conjunction with FIGS. 1 and 4) is described. In order to decrease search complexity, it is observed that an ideal hash function for the problem is one that directly hashes a linear subspace of a vector space, where the hash is independent of the choice of any set of basis vectors for the subspace. The entities which get checked are also subspaces, perhaps of lower dimension (which gives the ability to de-duplicate coded chunks, once a full coded-stripe is already hashed). To address the problem described herein, vector-spaces over finite fields are used which can be applied to coded de-duplication.

A client or source node (e.g. such as source 110 described above in conjunction with FIG. 1) may encode a file that comprises m linearly independent packets. Herein the m linearly independent packets may be denoted with v= $\{v_1 \ldots v_m\}$, where v is a vector in a finite field (l-dimensional) vector space with p elements $\mathbb{F}_p^l$, where p is a prime number.

Using coding coefficients $(\beta_1^{(j)}, \ldots \beta_m^{(j)})$, where j=1 ... n and $\beta_i \in \mathbb{F}_p$, partial coded packets may be expressed as $\tilde{C}^{(j)} = \Sigma \beta_1^{(j)} v_i$. An actual coded packet (i.e., the content stored in storage serve (j)) may be determined as a product of the coding coefficients and partial coded packets and expressed as:

$$(\beta_1^{(j)}\tilde{C}^{(j)} \ldots \beta_m^{(j)}\tilde{C}^{(j)}).$$

A packet w received by a storage node is a linear combination of these vectors and may be represented with a formula of:

$$w = \sum_{i=1}^{m} \beta_i v_i.$$

A public key and hash may be determined as follows. A number q is a large prime number such that p is a divisor of q−1. That is, q−1 can be divided by p. A group G has a generator g. The group G has an order p in $\mathbb{F}_q$. Since e order of multiplicate group $\mathbb{F}_q^*$ is q−1 (a multiple of p), a subgroup G may be found with order p in $\mathbb{F}_q^*$.

In embodiments, a source selects $\{\alpha_1, \alpha_2, \ldots \alpha_{m+l}\}$, a random set of elements in $\mathbb{F}_q^*$ as private keys. These private keys are only known to the source. The public key may be represented as $\{h_i = g^{\alpha_i}\}_{i=1, \ldots, m+l}$. The public key may be signed by some standard signature scheme, e.g., Digital Signature Algorithm (DSA). The public key is published by the source.

To compute the hash, the source generates a vector $u=(u_1, u_2, \ldots u_{m+l})$, wherein $u \in \mathbb{F}_p^{m+l}$ orthogonal to all vectors $y=\{y_1, \ldots y_m\}$, where $$y_i = (\overline{0 \ldots 1 \ldots 0} \ v_i),$$

where $(0 \ldots 1 \ldots 0)$ is length of m, and 1 occurs in the $i_{th}$ position. Specifically, the source finds a non-zero solution, u, to the set of equations $v_i*u=0$ for $i=1, \ldots, m$.

Then, the source computes a vector $x=(u_1/\alpha_1 \ldots u_{m+l}/\alpha_{m+l})$. The source signs the vector x with a standard signature scheme (e.g., DSA) to obtain a hash code. The vector x may be referred to as the hash code of the file being distributed. The storage device (e.g. storage node or storage server) checks if the coded packet w is in V (a subspace of $\mathbb{F}_p^{m+l}$) by computing $$d = \sum_{i=1}^{m+l} h_i^{x_i w_i}.$$

If the value of d is 1, the coded packet w can be de-duplicated. Otherwise, it cannot be de-duplicated for the pair (x, y). When the value of d is 1, meaning that a match is found, the coded packet is considered a valid code-word (or unpolluted). The unpolluted code-word needs to be further propagated through the network. Regarding the inventive concepts described herein, the unpolluted packets are ones that can be safely de-duplicated, and polluted packets, which is considered 'fresh', need to be stored.

Figure 2:
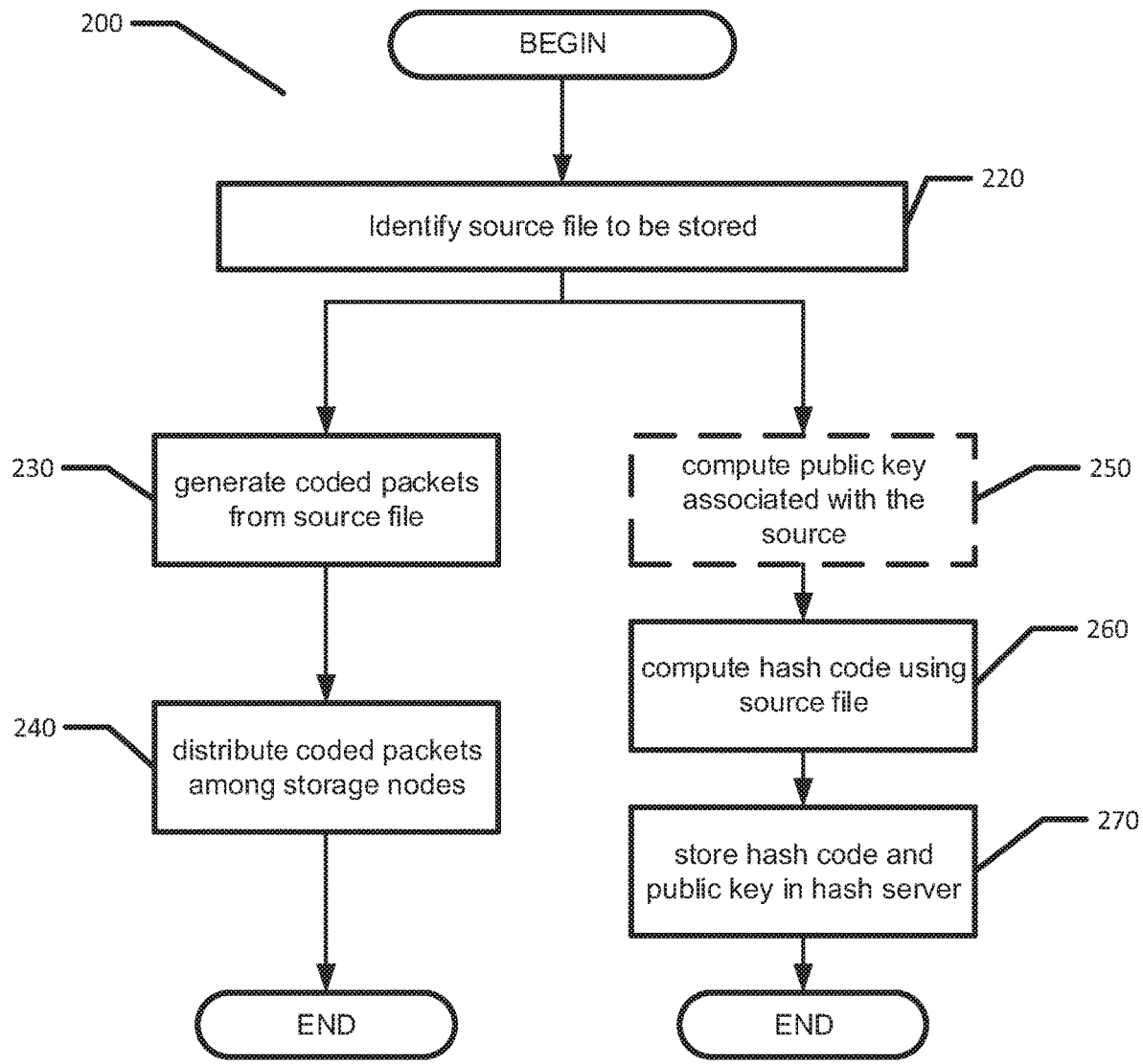
FIG. 2 is a flow diagram of an encoding process according to the concepts described herein.
Figure 3:
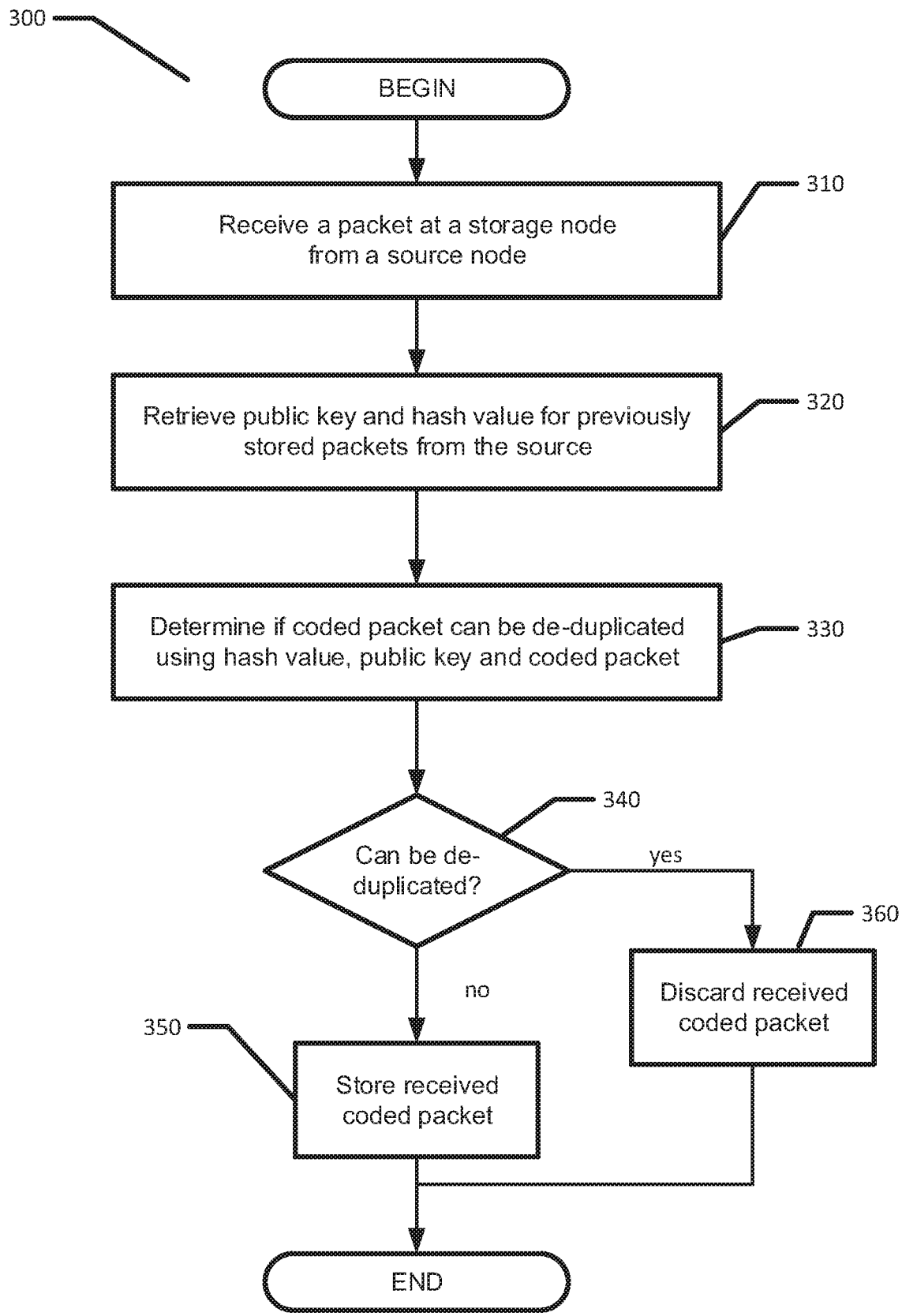
FIG. 3 is a flow diagram of an illustrative de-duplication process for a single source according to the concepts described herein.
Figure 4:
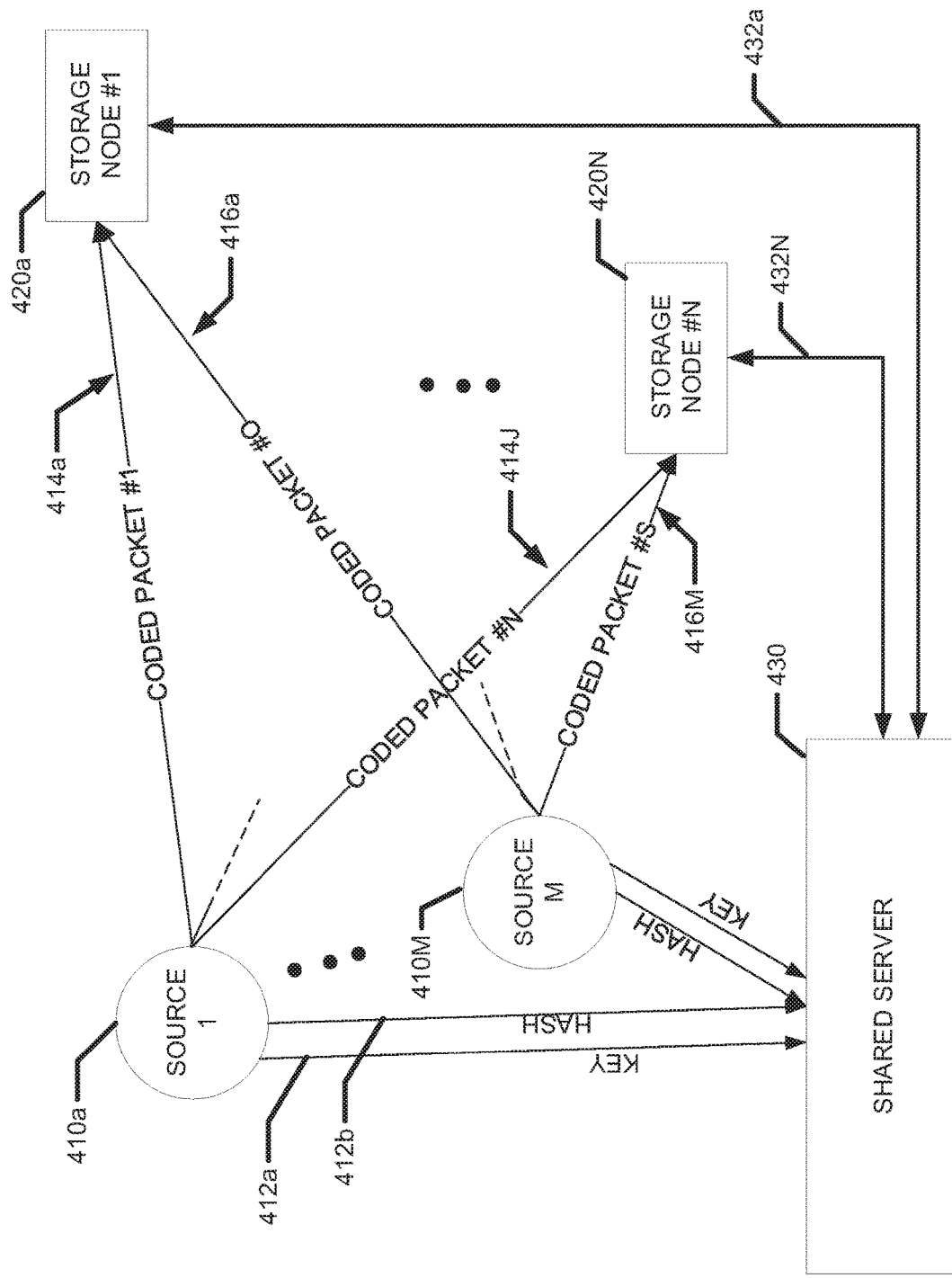
FIG. 4 is a block diagram of a system having multiple sources storing files as a plurality of coded packets in a distributed storage system having N storage nodes according to the concepts described herein.
Figure 5:
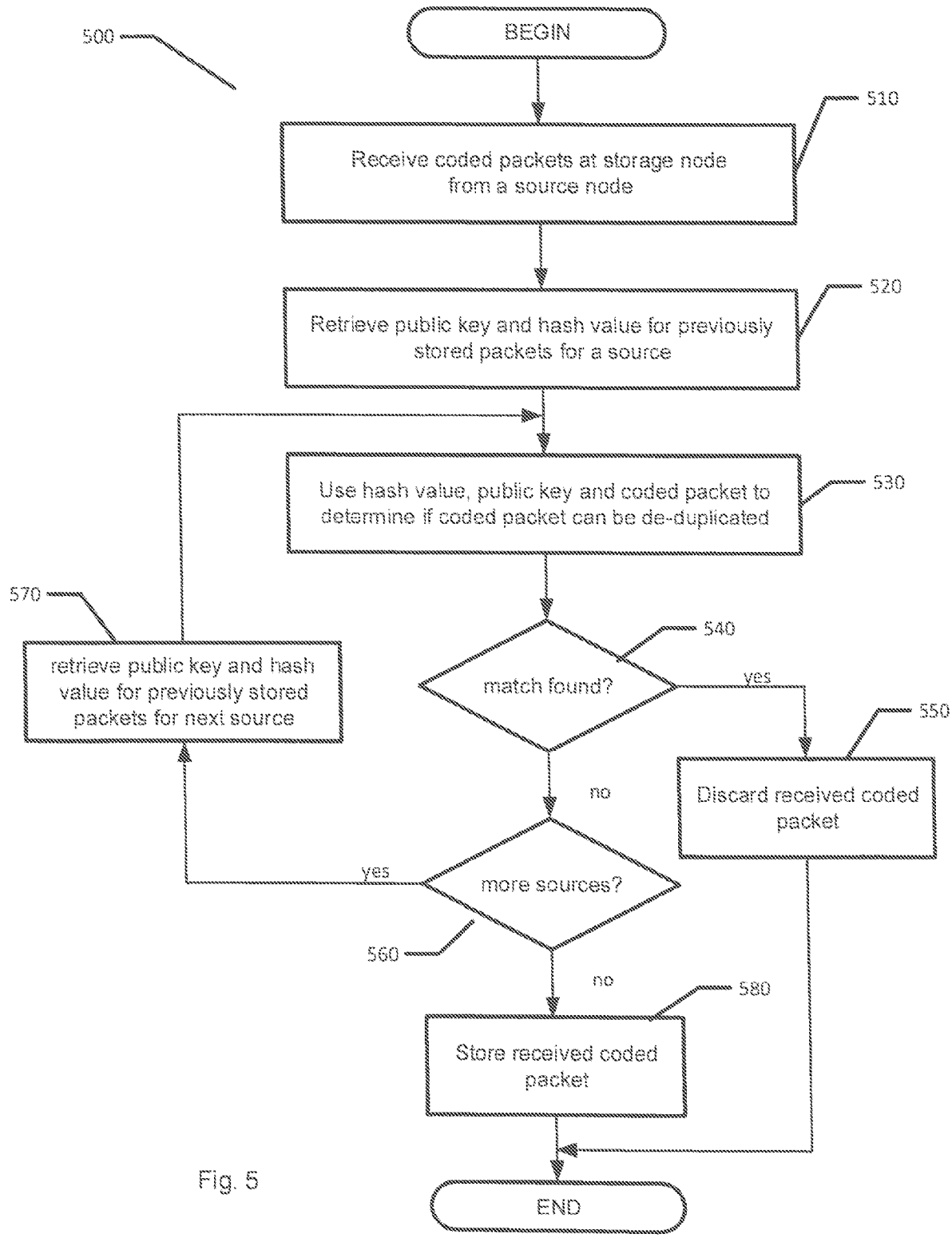
FIG. 5 is a flow diagram of a de-duplication process for system having multiple sources storing files as a plurality of coded packets in a distributed storage system having N storage nodes according to the concepts described herein.

FIGS. 2, 3 and 5 are flow diagrams showing illustrative processing that can be implemented within a client and/or storage system (e.g., within a system such as that shown and described above in conjunction with FIGS. 1, 1A and 1B and to be described below in conjunction with FIGS. 4 and 5). Rectangular elements (typified by element 220 in FIG. 2), herein denoted "processing blocks," represent computer software instructions or groups of instructions and diamond shapes elements (typified by element 340 in FIG. 3), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 2, an encoding process such as may be carried out by a source node (e.g., source node 110 discussed above in conjunction with FIG. 1). In processing block 220, a source file to be stored in a distributed storage system is identified internally or externally. In some embodiments, an external server or agent identifies a file and requests the source node to compute and store coded elements of the file. Once a source file has been identified, in processing block 230, the source node 110 may generate coded packets (e.g., coded packets 130a-130P in FIG. 1) based upon an encoding method selected by the source node. In embodiments, the network coding method used by the source may be Linear Network Coding (LNC) and in particular may be Random Linear Network Coding (RLNC). Alternately, any other suitable encoding methods may be used, as can be appreciated by those of ordinary skill in the pertinent art.

In processing block 240, the source node 110 may distribute the P coded packets 130a-130P to a plurality of storage nodes (e.g., storage nodes 120a-120N in FIG. 1). In embodiments, the source node 110 may sequentially distribute the coded packets to some or all of the storage nodes. For example, the packets may be sequentially distributed one-by-one to each of the storage nodes. In embodiments, the source node 110 may randomly distribute the coded packets to some or all of the storage nodes. In embodiments, the source node 110 may distribute more coded packets to a storage node having a connection with a data transfer rate which is higher compared to the data transfer rates of other nodes in the system (e.g. the source node 110 may distribute more coded packets to a storage node having a connection which is faster (or has a bandwidth which is higher) compared with the connection (or bandwidth) of other nodes). Alternately, any other suitable distribution method may be applied, as can be appreciated by those of ordinary skill in the pertinent art.

In optional processing block 250, the source node 110 may generate a public key associated with the source node. As described above, in cases in which a public key is used in conjunction with the hash, the public key is generated and stored only once for each source node. The public key is independent of the input file whereas the hash is a function of the file. Accordingly, if a public key is generated and stored already, processing block 250 may be skipped.

In processing block 260, the source node 110 may generate a hash code associated with the source file. One illustrative hashing technique described above may be used to generate the hash code. Alternately, any other suitable hashing methods may be used, as can be appreciated by those of ordinary skill in the pertinent art. In processing block 270, the source node 110 may store the generated hash code and optionally a public key in a hash server (e.g., hash server 140 in FIG. 1).

Referring now to FIG. 3 an illustrative de-duplication process for a single source (e.g. such as shown in FIG. 1) is presented. In processing block 310, a storage node (e.g., storage node 120a in FIG. 1) receives a coded packet from a source (e.g., source node 110 in FIG. 1). In processing block 320, the storage node may retrieve a hash value and optionally a public key for previously stored packets from the same source node based upon the hash value of the coded packet received from the source node.

In processing block 330, the storage node may determine whether the received coded packet can be de-duplicated. That is, the storage node may determine if the coded packet is stored in the storage node such that the received packet is safely discarded. The storage node may use the hash code, public key, and received coded packet to determine if the coded packet can be de-duplicated. If the received coded packet is encoded by a same source code and the hash value of the received packet was stored in the hash server, the received packet may be safely de-duplicated.

One illustrative technique to determine whether a received packet is de-duplicable based upon the hash code, public key, and received coded packet is described above.

In embodiments, the source node may find a match between a hash value of the received coded packet and the hash code retrieved from the hash server to determine whether the received packet can be de-duplicated (i.e. discarded or otherwise deleted from one or more storage nodes).

As shown in decision block 340, if it is determined that the received packet can be de-duplicated, the storage node may discard the received coded packet, as shown in processing block 360. Otherwise (i.e., it is determined that the received packet cannot be de-duplicated), the storage node stores the coded packet into its storage space (e.g., 126 in FIG. 1B).

Referring now to FIG. 4, a generalized distributed storage system capable of operating in accordance with the deduplication concepts and techniques described herein includes a plurality of sources, with here M sources being shown 410a-410M and a plurality of storage nodes, with here, N storage nodes 420a-420N being shown. The system may thus include a first plurality of M source nodes 410a-410M that store files as a plurality of coded packets 414a-414J, 416a-416M in a distributed storage system having a second plurality of N storage nodes 420a-420N where M and N are integers and may or may not have the same value (i.e. M may or may not equal N).

In the case where encryption is used, each of the source nodes 410a-410M may distribute respective public keys to a hash server 430. In addition, for each file to be stored among the storage nodes 420a-420N, each source nodes 410a-410M generates a hash value which is also stored in the hash server 430. Thus, all public keys and hash codes are stored in the hash server 430 which may for example be provided as a shared metadata server.

When determining whether a received coded packet can be de-duplicated, each storage node 420a-420N may communicate with shared server 430 (e.g. via paths 432a-432N) to retrieve hash values and optionally public keys to determine whether de-duplication can be performed.

In general, each source node may encode several files. All public keys (when used) and hash codes are stored in the shared hash server 430. It is desirable for each of the storage nodes to be able to reduce (and ideally entirely eliminate) redundant coded packets or blocks stored in the storage nodes. For at least the reasons described hereinabove, if some coding methods, such as RLNC, are used, determining whether a packet is de-duplicatable by direct comparison is not practical. Thus, the sources 410a-410M and/or storage nodes 420a-420N are capable of using the hash codes from the metadata server 430 to perform a de-duplication function using, for example, one of the techniques described herein in conjunction with FIG. 3 or 5.

Referring now to FIG. 5, a de-duplication process for a system having multiple sources is presented. The process described herein is generally similar with the process described in conjunction with FIG. 3. In processing block 510, a storage node (e.g., storage node 120a in FIG. 1) receives a coded packet from a source (e.g., source node 110 in FIG. 1). In processing block 520, the storage node may retrieve a hash value and optionally a public key for previously stored packets from the same source node.

In processing block 530, the storage node may determine whether the received coded packet can be de-duplicated. That is, the storage node may determine if the coded packet is stored in the storage node such that the received packet is safely discarded. The storage node may use the hash code, public key, and received coded packet to determine if the coded packet can be de-duplicated, as described above at least in conjunction with processing block 330 of FIG. 3.

As shown in decision block 540, if it is determined that the received packet can be de-duplicated, the storage node (or some other node) may discard, drop or otherwise remove from the system the received packet, as shown in processing block 550.

If it is determined that the received packet cannot be de-duplicated, the storage node determines whether more source nodes have stored coded packets in the storage node as shown in decision block 560. If there are more sources that stored coded packets in the storage node, the storage nodes may repeat processing steps 530, 540 and 560 after retrieving a hash code and (optionally) public key for the additional source nodes from the hash server, as shown in processing block 570.

If it is determined that the received coded packet cannot be de-duplicated (in decision block 540) and there are no other sources to check (in decision block 560), the storage node may store the coded packet into its storage space (e.g., 126 in FIG. 1B).

Figure 6:
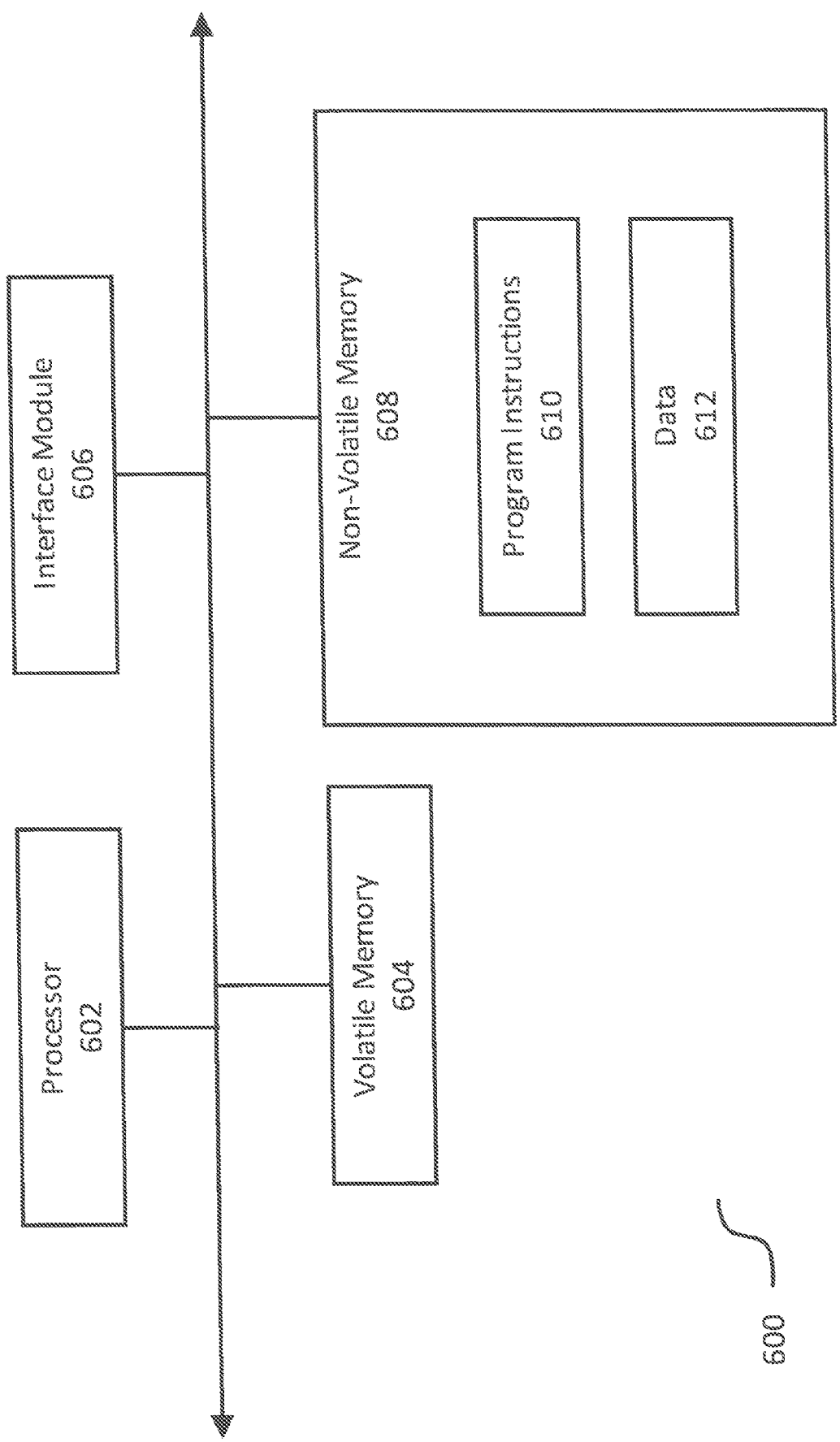
FIG. 6 is a block diagram of an illustrative system implementating processes described in FIGS. 2, 3, and 5 according to the concepts described herein.

Referring now to FIG. 6, an illustrative implementation of a processing device 600 which may be suitable to implement the processing techniques described herein includes a processor 602, a volatile memory 604, a non-volatile memory 606 (e.g., hard disk) and the interface module 608 (e.g., a user interface, USB interface and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 400).

The processes described herein (e.g., process 200, 300, and 500) is not limited to use with hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Figure 7:
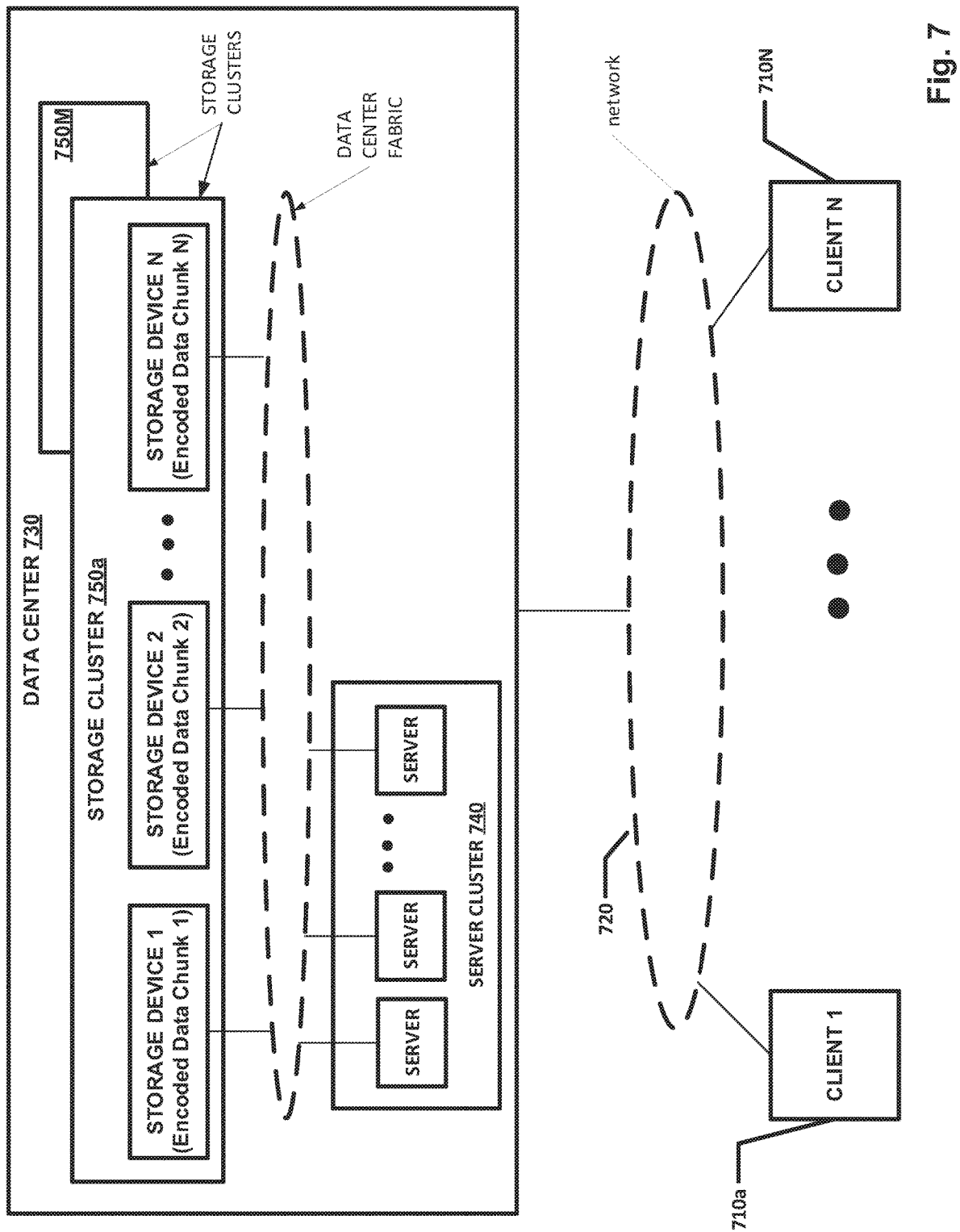
FIG. 7 is a block diagram of a data center operating in accordance with the de-duplication concepts described herein.

Referring now to FIG. 7, a data center 730 may include one or more storage clusters 750a-750M coupled with a data center fabric to one or more server clusters 740, as is generally known. A plurality of clients 710a-710N may be coupled through a network 720 to the data center. The data center 730 operates in accordance with the de-duplication techniques described above in conjunction with FIGS. 1-5 to allow de-duplication of coded packets without decoding a packet.

The technique described herein may be the first technique to carry target de-duplication in back end data centers that use network coding (e.g. RLNCs) for data storage. In embodiments, the techniques described herein can be built on top of the existing coding libraries (such as the Kodo erasure coding library provided by Steinwurf ApS, for example), which provides standard implementations for RLNCs. These techniques may be implemented entirely in a data center. In this approach, clients could be entirely oblivious to the presence of this technique in the data center.

The use of such a hashing system and technique described herein may enable de-duplication directly in the erasure coded domain (rather than in the raw data domain, as is conventionally done). Since the de-duplication process takes place directly in the erasure coded domain, there may be significant potential to reduce computational requirements of carrying out de-duplication in distributed storage systems utilizing network coding including but not limited to random linear network coding (RLNC).

With the approach described herein, several goals are achieved. First. a method for the individual storage servers to carry out deduplication of coded-data blocks that were generated from the same file, but encoded and send to the server from different sources is provided. The storage node (or storage server) may accomplish the tasks by communicating with a hash server (or metadata server) and doing suitable computations. The hash stored in the hash server may be secure such that even if one gains access to the information (public key, hash codes) stored in the hash server, it is computationally hard to generate an input file having hash codes matching the leaked hash.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method for encoding a file, the method comprising:
identifying a file to be stored;
encoding the file to generate a plurality of coded packets;
generating a hash code associated with the file, wherein the generation of the hash code includes generating a set of first vectors based on the contents of the file and generating a second vector orthogonal to a set of first vectors;
distributing the plurality of coded packets to a plurality of storage nodes; and
storing the hash code associated with the file in a hash server.

2. The method of claim 1, further comprising:
generating and storing a public key associated with a source node in the hash server, wherein the generation of the hash code includes computing a third vector based on the second vector and a private key.

3. The method of claim 1, wherein generating a hash code associated with the file comprises generating a hash code for a plurality of files.

4. The method of claim 1, wherein encoding the file further comprises:
encoding the file using random linear network coding (RLNC) to generate a plurality of RLNC coded packets.

5. The method of claim 1, wherein distributing the plurality of coded packets to a plurality of storage nodes further comprises at least one of:
distributing the plurality of coded packets in a sequential order to a plurality of storage nodes; and
distributing the plurality of coded packets in a random order to a plurality of storage nodes.

6. The method of claim 1, wherein distributing the plurality of coded packets to a plurality of storage nodes further comprises:
distributing the plurality of coded packets to a plurality of storage nodes based upon a data transfer rate between at least one source node and at least some of the plurality of storage nodes.

7. The method of claim 1, wherein the file comprises m linearly independent packets $v=\{v_1 \ldots v_m\}$, wherein v is a vector in a finite 1-dimensional vector over a space with p elements $\mathbb{F}_p^l$, wherein the generation of the hash code includes generating a set of first vectors $y=\{y_1, \ldots y_m\}$, where $$y_i = \overline{(0 \ldots 1 \ldots 0 \, v_i)}$$

and generating a second vector $u=(u_1, u_2, \ldots u_{m+l})$, wherein $u \in \mathbb{F}_p^{m+l}$ is orthogonal to all vectors $y=\{y_1, \ldots y_m\}$.

8. The method of claim 7, wherein the generation of the hash code includes
selecting a set of elements $\{\alpha_1, \alpha_2, \alpha_{m+l}\}$ in $\mathbb{F}_p^*$ as private keys; and
computing a third vector $x=(u_1/\alpha_1 \ldots u_{m+l}/\alpha_{m+l})$.

9. An apparatus for encoding a file, the apparatus comprising:
a coded packet generator configured to:
  encode the source file to generate a plurality of coded packets; and
  distribute the plurality of coded packets to a plurality of storage nodes; and
a hash generator configured to:
  generate a hash code associated with the source file, wherein the generation of the hash code includes generating a set of first vectors based on the contents of the file and generating a second vector orthogonal to a set of first vectors; and
  store the hash code associated with the source file in a hash server.

10. The apparatus of claim 9, further comprising:
a public key generator configured to:
  generate and store a public key associated with the source node in the hash server.

11. The apparatus of claim 9, further comprising means for identifying a source file to be stored.

12. The apparatus of claim 9, wherein the file comprises m linearly independent packets v={$v_1 \ldots v_m$}, wherein v is a vector in a finite 1-dimensional vector over a space with p elements $\mathbb{F}_p^l$, wherein the generation of the hash code includes generating a set of first vectors y={$y_1, \ldots y_m$}, where $$y_i = (\overline{0 \ldots 1 \ldots 0\ v_i})$$

and generating a second vector u=($u_1, u_2, \ldots u_{m+l}$), wherein u$\in \mathbb{F}_p^{m+l}$ is orthogonal to all vectors y={$y_1, \ldots y_m$}.

13. The apparatus method of claim 12, wherein the generation of the hash code includes
  selecting a set of elements {$\alpha_1, \alpha_2, \alpha_{m+l}$} in $\mathbb{F}_p^*$ as private keys; and
  computing a third vector x=($u_1/\alpha_1 \ldots u_{m+l}/\alpha_{m+l}$).

14. A method for de-duplicating a coded packet in a distributed storage system, the method comprising:
  retrieving a hash code associated with a source file from a hash server, the hash code being computed by generating a set of first vectors based on the contents of the source file and generating a second vector orthogonal to a set of first vectors;
  determining whether the coded packet can be deduplicated based upon finding a match using the coded packet and the hash code; and
  in response to determination that the coded packet can be deduplicated, discarding the coded packet.

15. The method of claim 14, further comprising:
  retrieving a public key, from the hash server, corresponding to a source node that sent the coded packet; and
  using the public key when determining whether the coded packet can be deduplicated.

16. The method of claim 14, further comprising:
  in response to determination that the coded packet cannot be deduplicated, retrieving an additional hash code to determine whether the coded packet can be deduplicated.

17. The method of claim 16, further comprising:
  retrieving an additional public key corresponding an additional source node to determine whether the coded packet can be deduplicated.

18. The method of claim 14, wherein the coded packet is a network coded packet.

19. The method of claim 14, wherein the coded packet is a random linear network coded (RLNC) packet.

20. A storage node for de-duplicating a coded packet in a distributed storage system, the storage node comprising:
  a de-duplication processor configured to:
    retrieve a hash code associated with a source file from a hash server, the hash code being computed by generating a set of first vectors based on the contents of the source file and generating a second vector orthogonal to a set of first vectors;
    determine whether the coded packet can be deduplicated based upon finding a match using the coded packet and the hash code; and
    in response to determination that the coded packet has being stored, discard the coded packet; and
  a storage space; and
  a storage processor configured to:
    store and retrieve data from/to the storage space.

* * * * *